US012657869B2

(12) United States Patent
    Peddireddy

(10) Patent No.: US 12,657,869 B2
(45) Date of Patent: Jun. 16, 2026

(54) METHOD AND SYSTEM FOR SELECTING A FURNITURE ITEM BASED ON A REFERENCE IMAGE

(71) Applicant: Fulhaus Inc., Montreal (CA)

(72) Inventor: Dheeraj Reddy Peddireddy, Montreal (CA)

(73) Assignee: Fulhaus Inc., Montreal (CA)

( * ) Notice: Subject to any disclaimer, the term of this patent is extended or adjusted under 35 U.S.C. 154(b) by 313 days.

(21) Appl. No.: 18/382,274

(22) Filed: Oct. 20, 2023

(65) Prior Publication Data

US 2024/0135676 A1      Apr. 25, 2024
US 2024/0233323 A9      Jul. 11, 2024

Related U.S. Application Data

(60) Provisional application No. 63/380,271, filed on Oct. 20, 2022.

(51) Int. Cl.
    *G06V 10/74*          (2022.01)

(52) U.S. Cl.
    CPC ........ *G06V 10/761* (2022.01); *G06V 2201/07* (2022.01)

(58) Field of Classification Search
    CPC ...... G06V 10/761; G06V 10/50; G06V 10/56; G06V 2201/07
    See application file for complete search history.

(56) References Cited

U.S. PATENT DOCUMENTS

2019/0295151 A1*   9/2019   Ghadar ............... G06F 16/9038
2021/0133426 A1*   5/2021   Karpas .............. G06F 18/24143
2022/0215462 A1*   7/2022   Lobbato ............. G06Q 20/3276
2023/0230326 A1*   7/2023   Hill .......................... G06T 17/00
                                                          345/419
2024/0212243 A1*   6/2024   Sadalgi .................. G06N 3/045

OTHER PUBLICATIONS

Liu et al, Furnishing Your Room by What You See: An End-to-End Furniture Set Retrieval Framework with Rich Annotated Benchmark Dataset, 2020, arXiv:1911.09299v2, pp. 1-12. (Year: 2020).*
Pardhi et al, Extraction and retrieval of furniture from designing decoration and furniture database, 2017, International Conference on Communication and Informatics, pp. 1-6. (Year: 2017).*
Wei et al, Home Environment Augmented Reality System Based on 3D Reconstruction of a Single Furniture Picture, 2022, Sensors 22: 1-19. (Year: 2022).*
Tautkute et al., What Looks Good with my Sofa: Multimodal Search Engine for Interior Design, 2018, arXiv:1707.06907v2, pp. 1-8. (Year: 2018).*

* cited by examiner

*Primary Examiner* — Kathleen M Broughton

(74) *Attorney, Agent, or Firm* — Taft Stettinius & Hollister LLP

(57)                   ABSTRACT

A computer-implemented method for selecting a furniture item based on a reference image, the method comprising: receiving a reference image and a room type; determining a main type of furniture items based on the room type; accessing a database comprising a plurality of main reference furniture items each belonging to the main type of furniture items; selecting a given one of the main reference furniture items based on the reference image; and outputting an identification of the given one of the main reference furniture items.

14 Claims, 4 Drawing Sheets

100

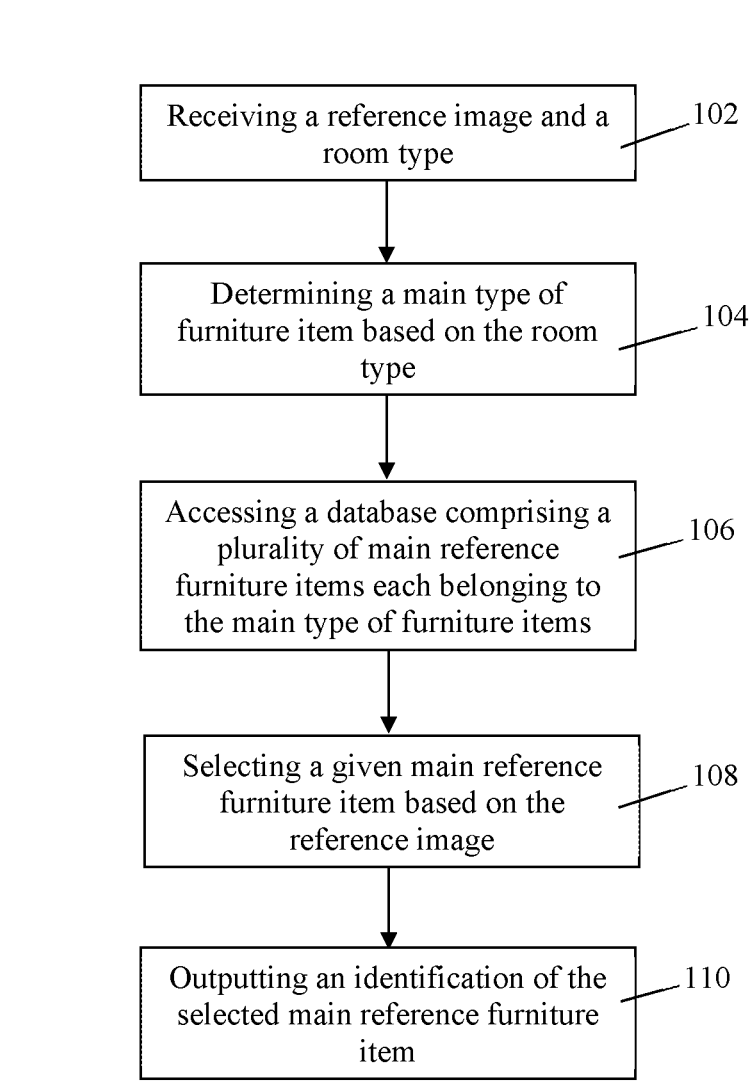

Receiving a reference image and a room type — 102

Determining a main type of furniture item based on the room type — 104

Accessing a database comprising a plurality of main reference furniture items each belonging to the main type of furniture items — 106

Selecting a given main reference furniture item based on the reference image — 108

Outputting an identification of the selected main reference furniture item — 110

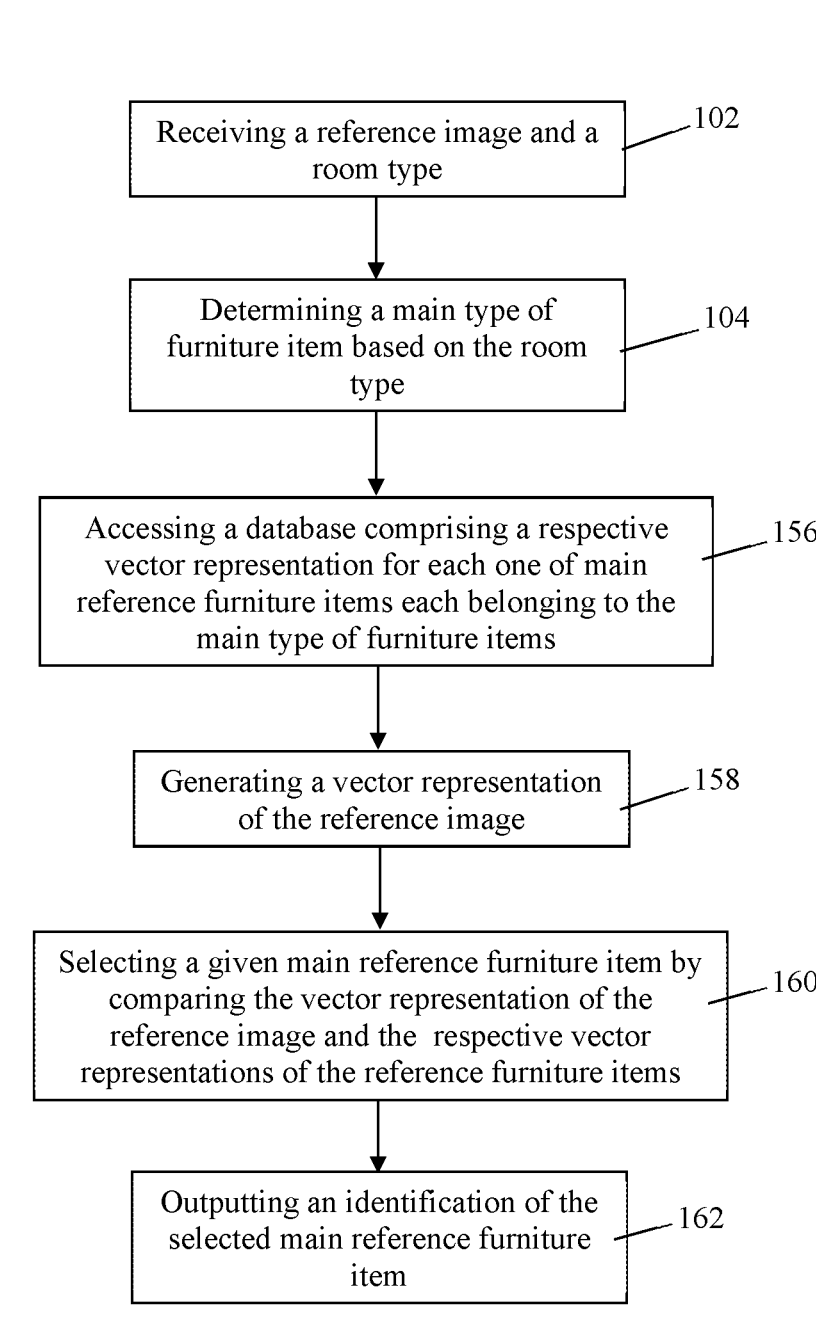

Receiving a reference image and a room type ⟋ 102

Determining a main type of furniture item based on the room type ⟋ 104

Accessing a database comprising a respective vector representation for each one of main reference furniture items each belonging to the main type of furniture items ⟋ 156

Generating a vector representation of the reference image ⟋ 158

Selecting a given main reference furniture item by comparing the vector representation of the reference image and the respective vector representations of the reference furniture items ⟋ 160

Outputting an identification of the selected main reference furniture item ⟋ 162

FIG. 4

METHOD AND SYSTEM FOR SELECTING A FURNITURE ITEM BASED ON A REFERENCE IMAGE

FIELD

The present technology pertains to the field of recommendation methods and systems, and more particularly to methods and systems for selecting a furniture item based on a reference image.

BACKGROUND

More and more short-term rental (STR) property owners look for providing unique and elevated experience to their rental clients to increase their listing competitivity in this market, and the profit. However, in order to deliver this experience, the property owners usually rely on interior design services to help them purchase high quality furniture and install the furniture as fast as possible so that the rental properties can generate profits as soon as possible.

However, traditional interior design services usually have a long turn over period, due to the complexity of design nature, i.e., communicate the vision, modify the design, select and purchase products and the shipment. Such a long project timeline cannot usually satisfy the needs of STR operators.

Therefore, there is a need for and improved method and system for selecting a furniture item based on a reference image.

SUMMARY

According to a first broad aspect, there is provided a computer-implemented method for selecting a furniture item based on a reference image, the method comprising: receiving a reference image and a room type; determining a main type of furniture items based on the room type; accessing a database comprising a plurality of main reference furniture items each belonging to the main type of furniture items; selecting a given one of the main reference furniture items based on the reference image; and outputting an identification of the given one of the main reference furniture items.

In some embodiments, the step of receiving a reference image and a room type comprises receiving the reference image and determining the room type from the reference image.

In some embodiments, the method further comprises detecting an object belonging to the reference type of furniture item within the reference image.

In some embodiments, the step of selecting the given one of the main reference furniture items comprises selecting a given one of the main reference furniture items based on at least one of the detected object and the reference image.

In some embodiments, the database comprises a respective reference vectorial representation for each one of the main reference furniture items.

In some embodiments, the method further comprises generating the respective reference vectorial representation.

In some embodiments, the step of said selecting comprises: generating a given vector representation for the reference image; and comparing the given vector representation for the reference image to the respective reference vectorial representation to identify the given one of the main reference furniture items.

In some embodiments, the method further comprises detecting an object belonging to the reference type of furniture item within the reference image.

In some embodiments, the step of generating the given vector representation for the reference image comprises generating a given vector representation for the detected object and said comparing comprises comparing the given vector representation for the detected object to the respective reference vectorial representation.

In some embodiments, the method further comprises generating a given vector representation for the detected object, said comparing comprises comparing the given vector representation for the detected object and the given vector representation of the reference image to the respective reference vectorial representation.

According to another broad aspect, there is provided a system for selecting a furniture item based on a reference image, the method comprising: a processor; and a non-transitory computer readable storage medium comprising instructions stored thereon; the processor, upon execution of the instructions, being configured for: receiving a reference image and a room type; determining a main type of furniture items based on the room type; accessing a database comprising a plurality of main reference furniture items each belonging to the main type of furniture items; selecting a given one of the main reference furniture items based on the reference image; and outputting an identification of the given one of the main reference furniture items.

In some embodiments, the processor is configured for receiving the reference image and determining the room type from the reference image.

In some embodiments, the processor is further configured for detecting an object belonging to the reference type of furniture item within the reference image.

In some embodiments, said selecting the given one of the main reference furniture items comprises selecting a given one of the main reference furniture items based on at least one of the detected object and the reference image.

In some embodiments, the database comprises a respective reference vectorial representation for each one of the main reference furniture items.

In some embodiments, the processor is further configured for generating the respective reference vectorial representation.

In some embodiments, said selecting comprises: generating a given vector representation for the reference image; and comparing the given vector representation for the reference image to the respective reference vectorial representation to identify the given one of the main reference furniture items.

In some embodiments, the processor is further configured for detecting an object belonging to the reference type of furniture item within the reference image.

In some embodiments, said generating the given vector representation for the reference image comprises generating a given vector representation for the detected object and said comparing comprises comparing the given vector representation for the detected object to the respective reference vectorial representation.

In some embodiments, the processor is further configured for generating a given vector representation for the detected object, said comparing comprises comparing the given vector representation for the detected object and the given vector representation of the reference image to the respective reference vectorial representation.

Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 is a flow chart illustrating a method for selecting a furniture item based on a reference image, in accordance with a first embodiment.

FIG. 4 is a flow chart illustrating a method for selecting a furniture item based on a reference image, in accordance with a second embodiment.

DETAILED DESCRIPTION

Figure 1:
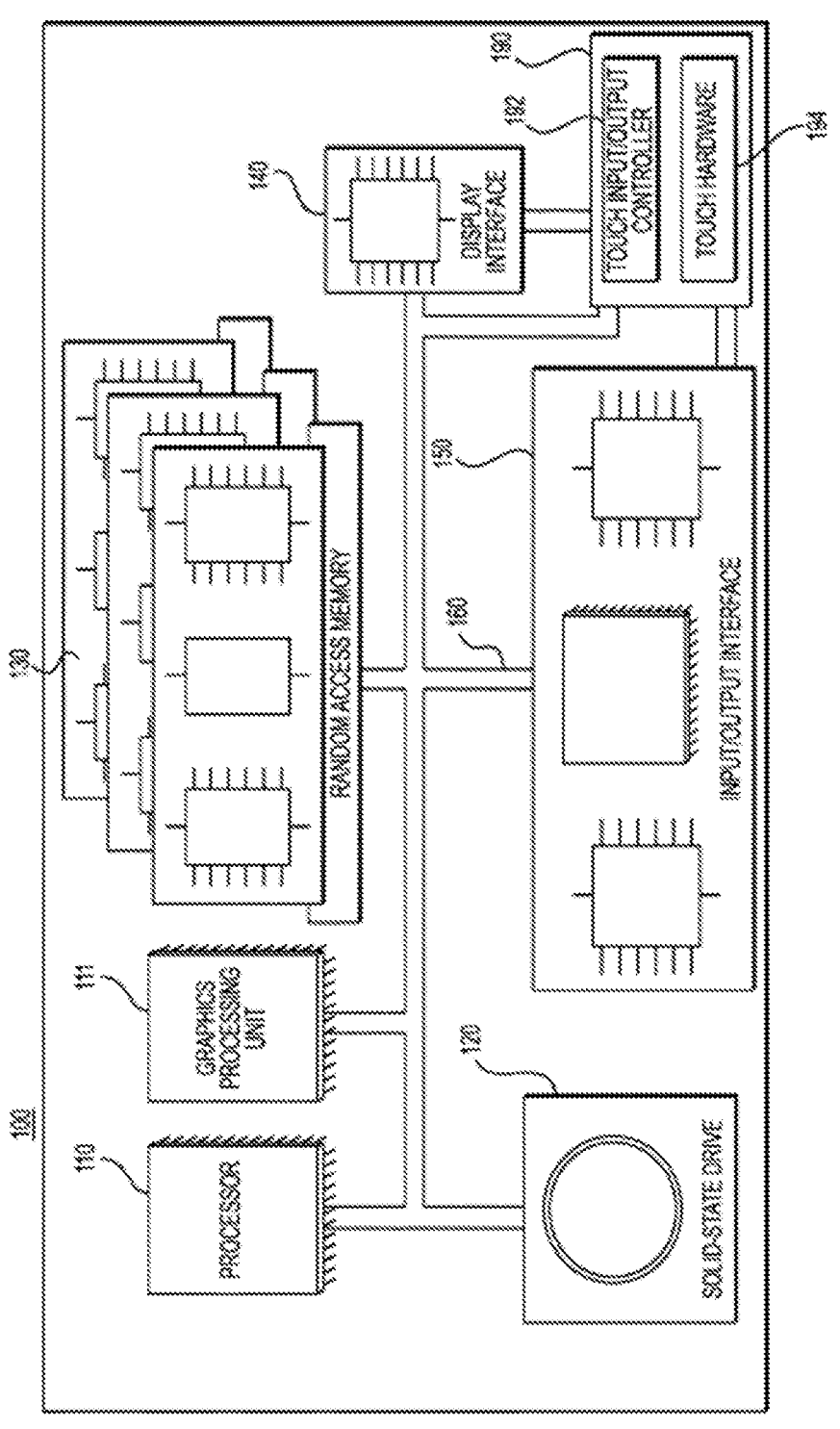
FIG. 1 illustrates a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g., a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for training an embedding model to perform link prediction in a knowledge hypergraph. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
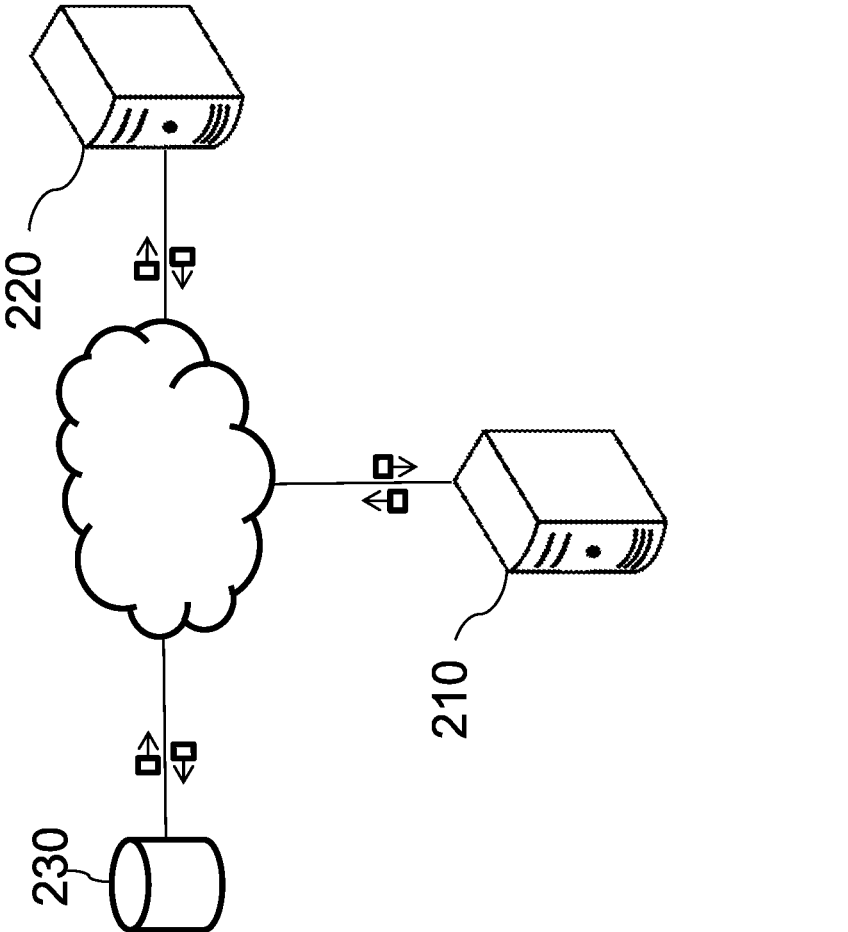
FIG. 2 illustrates a schematic diagram of a communication system in accordance with one or more non-limiting embodiments of the present technology.

Referring to FIG. 2, there is shown a schematic diagram of a system 200, the system 200 being suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a client device 210 associated with a user, a server 220, and a database 230 communicatively coupled over a communications network 240.

Client Device

The system 200 comprises a client device 210. The client device 210 is associated with the user. As such, the client device 210 can sometimes be referred to as a "electronic device", "end user device" or "client electronic device". It should be noted that the fact that the client device 210 is associated with the user does not need to suggest or imply any mode of operation—such as a need to log in, a need to be registered, or the like.

The client device 210 comprises one or more components of the electronic device 100 such as one or more single or multi-core processors collectively represented by processor 110, the graphics processing unit (GPU) 111, the solid-state drive 120, the random-access memory 130, the display interface 140, and the input/output interface 150.

In one or more embodiments, the user may use the client device 210 to query a recommendation of furniture item(s) based on a reference image and to receive the recommendation. The recommendation for the furniture item(s) may be for example executed by the server 220.

Server

The server 220 is configured to generate a recommendation of furniture item(s) based on a reference image.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a server running an operating system (OS). Needless to say that the server 220 may be implemented in any suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 240) via the communication network 240. The server 220 further comprises at least one computer processor (e.g., the processor 110 of the electronic device 100) operationally connected with the communication interface and structured and configured to execute various processes to be described herein.

In some non-limiting embodiments, the server 220 is configured for:

(i) receiving a reference image and a room type from the client device 210;

(ii) determining a main type of furniture items based on the room type;

(iii) accessing a database 230 comprising a plurality of main reference furniture items each belonging to the main type of furniture items;

(iv) selecting a given one of the main reference furniture items based on the reference image; and (v) outputting an identification of the given one of the main reference furniture items.

In some non-limiting embodiments, the server 220 is configured for:

(i) receiving a reference image and a room type from the client device 210;

(ii) determining a main type of furniture items based on the room type;

(iii) accessing a database 230 comprising a respective vector representation for main reference furniture items each belonging to the main type of furniture items;

(iv) generating a vector representation of the reference image;

(v) selecting a given main reference furniture item by comparing the vector representation of the reference image and the respective vector representations of the reference furniture items; and (vi) outputting an identification of the given one of the main reference furniture items.

Database

A database 230 is communicatively coupled to the server 220 and the client device 210 via the communications network 240 but, in one or more alternative implementations, the database 230 may be directly coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a processor that stores or makes use of the information stored in the database 230 or it may reside on separate hardware, such as on the server 220. The database 230 may receive data from the server 220 for storage thereof and may provide stored data to the server 220 for use thereof.

In some embodiments, the database 230 is configured to store inter alia an identification of main reference furniture items that each belong to a main type of furniture items. In an example in which a sofa represents the main type of furniture items, the database 230 may store different reference sofas. In another example in which a bed represents the main type of furniture items, the database 230 may store different reference beds. The database 230 further comprises at least one room type and an associated main type of furniture items.

In some embodiments, similar-looking main reference furniture items are regrouped together to enhance object recognition. For instance, categories like 'Sofa,' 'Love seat,' and 'Sectional' are intelligently consolidated into a single 'Sofa' category or main type of furniture. Such a strategic categorization not only improves the model's ability to differentiate between closely related items but also contributes to more accurate and relevant furniture recommendations.

In some embodiments, the identification of a main reference furniture item comprises a name, an ID code, a product code, a picture of the main reference furniture item, and/or the like.

In some embodiments, the identification of a main reference furniture item may further comprise a vector representation of the main reference furniture item, i.e., a vector representation of the features of the main reference item. For example, a vector representation may comprise at least one embedding or feature vector (such as a set of feature vectors) representing features of the main reference furniture item. In some embodiments, the vector representation is indicative of low-level features such as edges, color, gradient direction, etc. In some embodiments, a feature vector is a 4608-dimensional feature vector.

In some embodiments, the vector representation may further comprise, for each main reference furniture item, a respective color vector obtained by calculating color histograms.

In some embodiments, the vector representation may comprise a combined vector resulting from the combination or aggregation of a feature vector and a color vector.

In some embodiments, the database 230 also comprises, per type of rooms, secondary reference furniture items that belong to at least one secondary type of furniture items associated with a respective room type. For example, when the room type is a living room and the main type of furniture items is a sofa, the database 230 may comprise at least one secondary type of furniture items such as chair, carpet and floor lamp. In this case, the database 230 comprises a set of secondary reference furniture items for each secondary type of furniture items, e.g., a set of reference chairs, a set of reference carpets. a set of reference floor lamps and/or the like.

In some embodiments, a vector such as a feature vector, a color vector and/or a combined vector may be associated with each secondary reference furniture item contained in the database 230.

In some embodiments, the database 230 comprises different room types and for each room type, a set of main reference furniture items that belong to a respective main type of furniture items, and optionally at least of set of secondary reference furniture items that belong at least one respective secondary type of furniture items. For example, the types of rooms stored on the database 230 may be a bedroom and a living room. In this case, the database 230 comprises a first set of main reference furniture items for the bedroom, such as reference beds, and a second set of main reference furniture items for the living room, such as reference sofas. Optionally, the database 230 may at least one secondary type of furniture items for the bedroom. In this case, the database 230 comprises at least one set of secondary reference furniture items for the bedroom, such a set of reference nightstands, a set of reference carpets, a set of reference bedside lamps, etc. Similarly, the database 230 may comprise at least one secondary type of furniture items for the living room. In this case, the database 230 comprises at least one set of secondary reference furniture items for the living room, such a set of reference chairs, a set of reference floor lamps, a set of reference carpets, etc.

The database 230 may store well-known file formats such as, but not limited to image file formats (e.g., .png, jpeg), video file formats (e.g., .mp4, .mkv, etc.), archive file formats (e.g., .zip, .gz, .tar, .bzip2), document file formats (e.g., .docx, .pdf, .txt) or web file formats (e.g., .html).

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the client device 210, the server 220, the database 230, and/or another electronic device (not shown) and the communications network 240 is implemented will depend inter alia on how each electronic device is implemented.

The communication network 240 may be used in order to transmit data packets amongst the client device 210, the server 220 and the database 230. For example, the communication network 240 may be used to transmit requests from the client device 210 to the server 220. In another example, the communication network 240 may be used to transmit a response to the request from the server 220 to the client device 210.

Having explained how the electronic device 100 and the communication system 200 are implemented in accordance with one or more non-limiting embodiments of the present technology, reference will now be made to FIG. 3, which illustrates a recommendation method 100 in accordance with one or more non-limiting embodiments of the present technology.

FIG. 3 illustrates one embodiment of a computer-implemented method 100 for selecting or recommending a furniture item based on a reference image. The method 100 may be executed by an electronic device such as server 220.

A furniture item should be understood as a furniture or a piece of furniture that is designed or used to support various human activities such as sitting, eating, storing items, working, and sleeping. A furniture item may be a seating furniture, a table, a storage furniture, a bed, etc. Examples of furniture items comprise chairs, stools, benches, couches, recliners, ottomans, dining tables, coffee tables, end tables, side tables, console tables, desks, beds, sofas, cabinets, chests of drawers, dressers, wardrobes, closets, bookcases, shelves, beds, mattresses, headboards, footboards, bunk beds, sofa beds, futons, lamps, and/or the like. A furniture item may also be a decorative or ornamental item or object such as a blanket, a rug, a frame, a painting, a carpet, a switch, a lamp, a light bulb, etc.

At step 102, a reference image and a room type or an indication of a room type are received. The reference image and the indication of a room type may be transmitted to the server 220 by a user from the client device 210 for example.

A reference image may be seen as a source of inspiration for selecting the furniture item. In some embodiments, the reference image may be an image of a furniture item, such as a picture or an illustration of a furniture item. In other embodiments, the reference image may be an image of a room or a part of room, in which at least one furniture item is present. In further embodiments, the reference image may be unrelated to furniture items or rooms. For example, the reference image may be an image of an object, an animal, a person, a scene, etc.

The room type is indicative of the type of room in which the furniture item to be selected is to be placed. For example, a type of room may be a bedroom, a kitchen, a dining room, a living room, an office, etc.

In some embodiments in which the reference image is an image of a room, a room part or a furniture item, the step 102 comprises receiving the reference image only and determining the room type based on the received reference image. In embodiments in which the reference image is an image of a room or part of a room, object recognition or detection or classification can be used to identify the type of the room contained in the reference image. In embodiments in which the reference image is an image of a furniture item, object recognition or detection or classification may be used to identify the furniture item contained in the reference image or the furniture type of the furniture item, and the room type is determined based on the identified furniture or furniture type. For example, a database, such as database 230, containing furniture items and/or furniture types each associated with a respective room type may be accessed to determine the room type associated with the received reference image. For example, when it is determined that the reference image is an image of a bed and the database associates a bed with a bedroom, it is then determined that the room type associated with the received reference image is a bedroom.

It should be understood that any adequate object recognition method may be used for determining the room type associated with a reference image. For example, Convolutional Neural Networks (CNN), Region-based Convolutional Neural Networks (R-CNN) and its variants such as Fast R-CNN or Faster R-CNN, You Only Look Once (YOLO), Single Shot Multibox Detector (SSD), RetinaNet, Mask R-CNN, Vision Transformers (ViTs), Residual Networks (ResNets), or the like may be used for recognizing an object within an image.

At step 104, a main type of furniture items is determined based on the received room type.

In some embodiments, the main type of furniture items is determined by accessing the database 230 and retrieving the main type of furniture items associated with the received room type.

At step 106, the database 230 is accessed in order to retrieve, identify or have access to the main reference furniture items that belong to the determined main type of furniture items for the received room type. For example, if the room type is a living room and the determined main type of furniture items associated with a living room may be a sofa, then access is provided to the reference sofas associated with the living room of the database 230.

At step 108, a given one of the main reference furniture items that belong to the determined main type of furniture items for the received room type is selected based on the reference image and an identification of the selected main reference furniture item is outputted at step 110. For example, the identification of the selected main reference furniture item may be stored in memory or sent to the client device 210. The identification of the selected main reference furniture item may be the name of the selected main reference furniture item, an identification code, a product number, etc. In another example, the identification of the selected main reference furniture item corresponds to an image of the selected main reference furniture item which is retrieved from the database 230 and provided for display on the client device 210.

In some embodiments, the method 100 further comprises a step of determining whether the reference image comprises a furniture item that belongs to the determined main type of furniture items. In one embodiment in which the reference image comprises such a furniture item, the step 108 comprises selecting the given main reference furniture item based only on the furniture item contained in the reference image. In another embodiment in which the reference image comprises such a furniture item, the selection of the main reference furniture item is performed based on the furniture item contained in the reference image and the reference image itself, at step 108. In still another embodiment in which the reference image comprises such a furniture item, the selection of the main reference furniture item is performed based on the furniture item contained in the reference image and the remaining of the reference image, i.e., the reference image from which the identified furniture item has been removed.

In some embodiments, the method 100 further comprises a step of determining at least one secondary reference furniture item. In this case, for each secondary type of furniture items stored in the database 230, a given secondary reference furniture item is selected amongst the secondary reference furniture items stored in the database 230 based on the received reference image and the selected main reference furniture object.

For example, when a reference sofa has been selected for a living room at step 108, a reference chair, a reference floor lamp and a reference carpet may be further selected from the database 230 based on the reference image and the selected reference sofa.

FIG. 4 illustrates another embodiment of a computer-implemented method 150 for selecting or recommending a furniture item based on a reference image. The method 150 may be executed by an electronic device such as server 220.

Similarly, to the method 100, the method 150 comprises the step 102 of receiving a reference image and a room type, and the step 104 of determining a main type of furniture items based on the received room type.

In this embodiment, the database 230 comprises an embedding or vector representation for each main reference furniture item contained in the database 230 and for each main type of furniture items. As described above, a vector representation may comprise at least one feature vector (such as a set of vectors) representing features of the main reference furniture item. The vector representation may also comprise a color vector. In a further example, the vector representation may comprise a combined vector obtained by combining together a feature vector and a color vector.

At step 156, the database 230 is accessed in order to retrieve, identify or have access to the vector representations of the main reference furniture items that belong to the determined main type of furniture items for the received room type. For example, if the room type is a living room and the determined main type of furniture items associated with a living room is a sofa, then access is provided to the vector representations of the reference sofas associated with the living room of the database 230.

At step 158, a vector representation of the reference image is generated. It should be understood that any adequate embedding method for generating a vector representation of an image may be used.

In some embodiment, the same embedding method is used for generating the vector representations of the main reference furniture items stored in the database 230 and the vector representation of the reference image.

In some embodiments, step 158 comprises generating at least one feature vector for the reference image. It should be understood that any adequate method for generating a feature vector of an image may be used. For example, a CNN, an autoencoder or the like may be used for generating the feature vector of an image.

In some embodiments, the same embedding method is used for generating the feature vectors of the main reference furniture items stored in the database 230 and the feature vector of the reference image.

In some embodiments, step 158 further comprises generating a color vector from the reference image and combining together the feature and color vectors generated for the reference image to obtain a combined vector.

At step 160, a given main reference furniture item is selected by comparing the vector representation of the reference image and the vector representations of the main reference furniture items, thereby obtaining a selected main reference furniture item.

In some embodiments, step 160 comprises comparing the feature vector generated for the reference image to the feature vectors of the main reference furniture items stored in the database 230.

In some embodiments, step 160 comprises comparing the combined vector generated for the reference image to the combined vectors of the main reference furniture items stored in the database 230.

In some embodiments, the selected main reference furniture item corresponds to the nearest neighbor of reference image, i.e., the vector representation of the selected main reference furniture item is the vector presentation of the main reference furniture items that is the nearest to the vector representation of the reference image.

In some embodiments, the selected main reference furniture item is determined by identifying the feature vector of the selected main reference furniture items that is the nearest to the feature vector of the reference image.

In some embodiments, the selected main reference furniture item is determined by identifying the combined vector of the selected main reference furniture items that is the nearest to the combined vector of the reference image.

At step 162, the identification of the selected main reference furniture item is outputted.

In some embodiments, the method 150 further comprises a step of determining whether the reference image comprises a furniture item that belongs to the determined main type of furniture items. In this case, object recognition may be used for identifying the furniture item that belongs to the determined main type of furniture items in the reference image. In some embodiment in which the reference image comprises such a furniture item, the step 160 comprises generating a vector representation of the item belonging to the main type of furniture items contained in the reference image and the step of selecting the given main reference furniture item is performed by comparing the vector representation of the reference image item to the vector representations of the main reference furniture items stored in the database 230. In other embodiments in which the reference image comprises such a furniture item, the step 160 comprises generating a vector representation of the item belonging to the main type of furniture items and contained in the reference image, and the step of selecting the given main reference furniture item is performed by combining together the vector representation of the reference image item and the vector representation of the reference image to obtain a merged vector representation, and comparing the merged vector representation to the vector representations of the main reference furniture items stored in the database 230. In still other embodiments in which the reference image comprises such a furniture item, the step 160 comprises generating a first vector representation of the item belonging to the main type of furniture items and contained in the reference image and a second vector representation for the remaining of the reference image, i.e., the reference image from which the identified furniture item has been removed, to obtain a merged vector representation, and comparing the merged vector representation to the vector representations of the main reference furniture items stored in the database 230.

In some embodiments, combining two vector representations is performed by adding the two vector representations using weight factors. In another embodiment, the combination of two vector representations comprises multiplying together two vector representations. In a further embodiment, the combination of two vector representations comprises aggregating together two vector representations. It should be understood that any adequate method for combining together two vector representations may be used.

In some embodiments, the method 150 further comprises generating the vector representation of each main reference furniture item and storing the generated vector representations into the database 230.

In some embodiments, the method 150 further comprises a step of identifying at least one secondary reference furniture item. In this case, the database 230 comprises at least one secondary type of furniture items associated with the type of room and a vector representation for each secondary reference furniture item. The method 150 further comprises generating a merged vector representation by combining the vector representation of the reference image and the vector representation of the vector representation of the selected main reference furniture item to obtain a combined vector representation. For example, the two vector representations may be added together using weight factors. In another example, the two vector representations may be aggregated together, as described above. For each secondary type of furniture items associated with the received room type, at least one secondary reference furniture item is selected by comparing the merged vector representation to the vector representations of the secondary reference furniture items stored in the database 230. In some embodiments, the selected secondary reference furniture item corresponds to the secondary reference furniture item of which the vector representation is the nearest neighbor to the combined vector representation. It should be understood that more than one secondary furniture item may be selected for each secondary type of furniture items. For example, the database 230 may store three secondary types of furniture items associated with a room type and two secondary reference furniture items may be selected for each one of the three secondary types of furniture items, e.g., when for a living room, the three secondary types are carpets, floor light and chair, two reference carpets, two reference floor lamps and two reference chairs are selected from the database 230.

While in the above description, a single main furniture item is selected at step 108 of method 100 and step 158 of method 150, it should be understood that more than one main reference furniture item may be selected. For example, when vector representations are used for the selection step, the first x number of nearest neighbors may be selected. In an embodiment in which more than one main reference furniture item is selected, at least one secondary reference furniture item may also be selected for each selected main reference furniture item.

In an embodiment in which the reference image is analyzed to determine whether it contains a furniture item, to identify the type of a furniture item contained in the reference image or to determine the type of a room represented in the reference image, it should be understood that any adequate method for detecting or recognizing objects within an image may be used. For example, the server 220 may be configured to execute methods such as a fast R-CNN method, a RetinaNet method, a Single shot detection (SSD) method, etc. In some embodiments, the server 220 is configured for executing a YOLO model. This object detection model calculates the different class probabilities as well as the bounding boxes in a single propagation through a convolutional neural network. In some embodiments, the YOLO model is trained on the Darknet Backend, which is trained on Imagenet dataset. In another embodiment, the YOLO model is trained on COCO dataset. The pre-trained model provides the category probabilities as well as the bounding box locations in an image.

In an embodiment in which spectral representations are used for selecting the main reference furniture object, any adequate feature extraction method for extracting high level convolutional features from an image and allowing for a vector representation of the extracted features may be used. For example, a convolutional neural network model may be used. In some embodiments, the server 220 may be configured for executing VGG19 which is a deep convolutional neural network model. In some embodiments, the VGG19 model is trained on more than million images from Imagenet. This pre-trained network can classify images into 1000 different categories. In some embodiments, the reference image is resized to 100×100×3 before being passed into the VGG19 Deep CNN model to obtain a 4068 dimensional feature vector.

In an embodiment in which the main reference furniture item is selected by determining at least one closest neighbor, it should be understood that any adequate method for determining closest neighbors may be used. In some embodiments, the server 220 is configured for executing a K-nearest neighbors (KNN) method which is used for both regression and classification. By calculating the distance between the test data and all of the training points, KNN tries to predict the correct class for the test data. Then the K points that are closest to the test data are chosen. The KNN algorithm determines which classes of the "K" training data the test data will belong to, and the class with the highest probability is chosen. Similarity scores may be used in calculating the closest points in the dataset.

Modifications and improvements to the above-described implementations of the present technology may become apparent to those skilled in the art. The foregoing description is intended to be exemplary rather than limiting.

What is claimed is:

1. A computer-implemented method for selecting a furniture item based on a reference image, the method being executed by a processor, the method comprising:

receiving, at the processor, a reference image and determining a room type based on object recognition or detection or classification;

determining, at the processor, a main type of furniture items based on the room type;

accessing, in a memory in communication with the processor, a database comprising a plurality of main reference furniture items each belonging to the main type of furniture items, the database comprising a respective reference vectorial representation for each one of the main reference furniture items;

selecting a given one of the main reference furniture items based on the reference image, said selecting comprising: generating a given vector representation for the reference image; and comparing the given vector representation for the reference image to the respective reference vectorial representation to identify the given one of the main reference furniture items; and outputting, at a display device in communication with the processor, an identification of the given one of the main reference furniture items.

2. The method of claim 1, further comprising detecting an object belonging to the reference type of furniture item within the reference image.

3. The method of claim 2, wherein said selecting the given one of the main reference furniture items comprises selecting a given one of the main reference furniture items based on at least one of the detected object and the reference image.

4. The method of claim 1, further comprising generating the respective reference vectorial representation.

5. The method of claim 1, further comprising detecting an object belonging to the reference type of furniture item within the reference image.

6. The method of claim 1, wherein said generating the given vector representation for the reference image comprises generating a given vector representation for the detected object and said comparing comprises comparing the given vector representation for the detected object to the respective reference vectorial representation.

7. The method of claim 1, further comprising generating a given vector representation for the detected object, said comparing comprises comparing the given vector representation for the detected object and the given vector representation of the reference image to the respective reference vectorial representation.

8. A system for selecting a furniture item based on a reference image, the system comprising:

a processor; and a non-transitory readable storage medium operatively connected to the processor, the non-transitory readable storage medium comprising computer-readable instructions stored thereon, the processor, upon execution of the instructions, being configured for:

receiving a reference image and determining a room type based on object recognition or detection or classification;

determining a main type of furniture items based on the room type;

accessing, in a memory in communication with the processor, a database comprising a plurality of main reference furniture items each belonging to the main type of furniture items, the database comprising a respective reference vectorial representation for each one of the main reference furniture items;

selecting a given one of the main reference furniture items based on the reference image, said selecting comprising: generating a given vector representation for the reference image; and comparing the given vector representation for the reference image to the respective reference vectorial representation to identify the given one of the main reference furniture items; and outputting, at a display device in communication with the processor, an identification of the given one of the main reference furniture items.

9. The system of claim 8, wherein the processor is further configured for detecting an object belonging to the reference type of furniture item within the reference image.

10. The system of claim 9, wherein said selecting the given one of the main reference furniture items comprises selecting a given one of the main reference furniture items based on at least one of the detected object and the reference image.

11. The system of claim 8, wherein the processor is further configured for generating the respective reference vectorial representation.

12. The system of claim 8, wherein the processor is further configured for detecting an object belonging to the reference type of furniture item within the reference image.

13. The system of claim 8, wherein said generating the given vector representation for the reference image comprises generating a given vector representation for the detected object and said comparing comprises comparing the given vector representation for the detected object to the respective reference vectorial representation.

14. The system of claim 8, wherein the processor is further configured for generating a given vector representation for the detected object, said comparing comprises comparing the given vector representation for the detected object and the given vector representation of the reference image to the respective reference vectorial representation.

* * * * *